United States Patent
Kondou et al.

(10) Patent No.: US 10,634,253 B2
(45) Date of Patent: Apr. 28, 2020

(54) SEAL RING

(71) Applicant: NTN CORPORATION, Osaka (JP)

(72) Inventors: Takumi Kondou, Mie (JP); Kohzoh Kakehi, Mie (JP)

(73) Assignee: NTN CORPORATION, Osaka (JP)

( * ) Notice: Subject to any disclaimer, the term of this patent is extended or adjusted under 35 U.S.C. 154(b) by 699 days.

(21) Appl. No.: 14/902,578

(22) PCT Filed: Jun. 30, 2014

(86) PCT No.: PCT/JP2014/067400
§ 371 (c)(1),
(2) Date: Jan. 3, 2016

(87) PCT Pub. No.: WO2015/002143
PCT Pub. Date: Jan. 8, 2015

(65) Prior Publication Data
US 2016/0186862 A1 Jun. 30, 2016

(30) Foreign Application Priority Data

Jul. 3, 2013 (JP) .................................. 2013-139984
Jun. 27, 2014 (JP) .................................. 2014-133008

(51) Int. Cl.
F16J 15/16 (2006.01)
C09K 3/10 (2006.01)
(Continued)

(52) U.S. Cl.
CPC ............. F16J 15/16 (2013.01); C09K 3/1006 (2013.01); C09K 3/1025 (2013.01); F16J 9/08 (2013.01);
(Continued)

(58) Field of Classification Search
CPC ...... F16J 15/34; F16J 15/3404; F16J 15/3408; F16J 15/3412; F16J 15/3416;
(Continued)

(56) References Cited

U.S. PATENT DOCUMENTS 3,429,581 A * 2/1969 Himmel ............... F16J 15/0881
277/625
4,193,606 A * 3/1980 Iverson ............... F16J 15/3208
277/556

(Continued)

FOREIGN PATENT DOCUMENTS

CN 1040667 A 3/1990
CN 102483162 A 5/2012
(Continued)

OTHER PUBLICATIONS

Supplementary European Search Report dated Jan. 5, 2017.
International Search Report dated Sep. 9, 2014.
English Abstract JP 2001-295943 A dated Oct. 26, 2001.

Primary Examiner — Kristina R Fulton
Assistant Examiner — L. Susmitha Koneru
(74) Attorney, Agent, or Firm — Hedman & Costigan, P.C.; James V. Costigan; Kathleen A. Costigan

(57) ABSTRACT

It is an object of the present invention to provide a seal ring which has small oil leak and low torque generation performance for improving fuel consumption in a favorable balance as originally intended by the present invention. A seal ring (1) is mounted on an annular groove formed on one member consisting of either a housing having a shaft hole or a rotary shaft inserted into the shaft hole, contacts a surface of other member consisting of either the housing or the rotary shaft, and slidably contacts a side wall surface of the annular groove at a non-sealed fluid side thereof. V-shaped concave portions (3) which do not contact the side wall surface of the annular groove are formed on at least one (Continued)

portion of an end of an inner diameter side of a side surface (2) of the seal ring (1).

4 Claims, 12 Drawing Sheets

(51) Int. Cl.
    *F16J 15/3272*     (2016.01)
    *F16J 9/08*     (2006.01)
    *F16J 15/48*     (2006.01)

(52) U.S. Cl.
    CPC ......... *F16J 15/164* (2013.01); *F16J 15/3272* (2013.01); *F16J 15/48* (2013.01); *C09K 2200/0657* (2013.01)

(58) Field of Classification Search
    CPC .... F16J 15/342; F16J 15/3424; F16J 15/3428; F16J 15/3432; F16J 15/16
    See application file for complete search history.

(56) References Cited

U.S. PATENT DOCUMENTS

| | | | |
|---|---|---|---|
| 5,722,665 A * | 3/1998 | Sedy | F16J 15/3412 277/400 |
| 6,296,254 B1 * | 10/2001 | Young | F16J 15/3404 277/408 |
| 6,485,021 B1 * | 11/2002 | Osaki | F16J 15/3412 277/400 |
| 7,523,944 B2 * | 4/2009 | Hatori | F16J 15/441 277/460 |
| 9,206,907 B2 * | 12/2015 | Nagai | F16J 15/441 |
| 2008/0023919 A1 * | 1/2008 | Umetsu | F16J 9/14 277/459 |
| 2009/0001671 A1 * | 1/2009 | Dietle | F16J 15/164 277/559 |
| 2009/0200749 A1 * | 8/2009 | Teshima | F16J 15/3404 277/512 |
| 2012/0018957 A1 * | 1/2012 | Watanabe | F16J 15/441 277/387 |
| 2012/0280456 A1 * | 11/2012 | Young | F16J 15/3412 277/400 |
| 2012/0280458 A1 * | 11/2012 | Artiles | F16J 15/3412 277/411 |
| 2013/0127120 A1 | 5/2013 | Nagai | |
| 2014/0008876 A1 | 1/2014 | Nagai | |
| 2014/0203517 A1 * | 7/2014 | Ferris | F16J 15/3428 277/400 |
| 2015/0226336 A1 * | 8/2015 | Kirchner | F16J 15/3412 277/411 |
| 2017/0009889 A1 * | 1/2017 | Seki | F16J 15/164 |

FOREIGN PATENT DOCUMENTS

| | | | |
|---|---|---|---|
| CN | 102918307 A | 2/2013 | |
| DE | 19713455 A1 * | 10/1998 | ............ F16J 15/441 |
| DE | 19932702 A1 | 1/2001 | |
| JP | 08-121603 A | 5/1996 | |
| JP | H09-096363 A | 4/1997 | |
| JP | 2001-295943 A | 10/2001 | |
| JP | 2006-009897 A | 1/2006 | |
| JP | 2007-107547 A | 4/2007 | |
| JP | 2008-275052 A | 11/2008 | |
| WO | 2006/001281 A1 | 1/2006 | |
| WO | 2013/094657 A1 | 6/2013 | |

* cited by examiner

Measured results of oil leak

Wear of side surface of seal ring after test finished (a)

(b)

(c)

| | Example 1 | Comparative example 1 |
|---|---|---|
| Appearance configuration |  |  |
| Groove configuration | V groove | No groove |
| Sliding contact area mm$^2$ | 110.4 | 148.8 |
| | Comparative example 2 | Comparative example 3 |
| Appearance configuration |  |  |
| Groove configuration | Square groove | Round groove |
| Sliding contact area mm$^2$ | 110.4 | 110.4 | und 1

SEAL RING

TECHNICAL FIELD

The present invention relates to a seal ring to be used to seal a fluid such as hydraulic oil, the pressure of which is utilized in equipment such as an automatic transmission (hereinafter referred to as AT) and a continuously variable transmission (hereinafter referred to as CVT).

BACKGROUND ART

An oil seal ring for sealing hydraulic oil is mounted on necessary positions of equipment such as the AT and the CVT. For example, the oil seal ring is mounted on a pair of annular grooves formed on a rotary shaft inserted into a shaft hole of a housing by spacing the annular grooves at a certain interval so that a side surface and an inner circumferential surface of each oil seal ring receive the hydraulic oil supplied from an oil passage disposed between both annular grooves. An opposed side surface and an outer circumferential surface of each oil seal ring seal a side wall of the corresponding annular groove and the inner circumferential surface of the housing. A sealing surface of each seal ring slidably contact the side wall of the corresponding annular groove and the inner circumferential surface of the housing, with the sealing surfaces of both seal rings holding the hydraulic pressure of the hydraulic oil between both seal rings. The above-described oil seal is demanded to have a small frictional loss and a sufficiently high oil sealing performance. In recent years, to improve fuel consumption is an important problem to be solved. To this end, the seal ring is desired to maintain a satisfactory sealing performance and at the same time have improved low torque generation performance.

As such a seal ring, as shown in FIG. 9, the seal ring is proposed as disclosed in a patent document 1. FIG. 9 is partly cutaway view of the seal ring. As shown in FIG. 9, in the seal ring, a fluid flow path for introducing a fluid to be sealed thereinto is formed on the sliding contact surface 21 of the seal ring, and the projected portion 23 (the concave portion 22 is formed at both sides of the projected portion) is formed in the middle of the flow path to generate a dynamic pressure so that the surface pressure is decreased.

As shown in FIG. 10, another seal ring is proposed as disclosed in a patent document 2. FIG. 10 shows a state in which the seal ring is mounted on the annular groove. As shown in FIG. 10, the seal ring is mounted on the annular groove 31, and the concave portions 34 having the construction in which the edge of the end portion of the non-contact portion 33 is partly cut out are formed on the end portion of the non-contact portion 33 of the sliding contact surface 32.

PRIOR ART DOCUMENTS

Patent Documents

Patent document 1: Japanese Patent Application Laid-Open Publication No. 8-121603
Patent document 2: Japanese Patent Application Laid-Open Publication No. 2008-275052

SUMMARY OF THE INVENTION

Problem to be Solved by the Invention

However, in the case of the seal ring of the patent document 1, the dynamic pressure-caused production of the oil film formation effect can be expected at a high-speed rotation, but the oil film formation effect hardly appears at a low-speed rotation. Therefore an oil film cannot be formed on the sealing surface (the portion of the sliding contact surface 21 which makes sliding contact with the annular groove) at the low-speed rotation. Thus the construction of the seal ring is incapable of contributing to a decrease in torque and wear. As the reason, the apex of the projected portion 23 is disposed inward from the sliding contact surface 21 of the seal ring. At the time of the low-speed rotation, oil which has entered one concave portion 22 (lubricating groove) rides over the projected portion 23 and flows to the adjacent concave portion 22.

Furthermore, in the seal ring of the patent document 2, oil can be easily introduced into the sliding contact surface 32. Thus the construction is excellent in the performance of forming an oil film on the sliding contact surface 32 from the time of the low-speed rotation until the time of the high-speed rotation. Thus the seal ring is excellent in low torque generation performance. But on the other hand, the concave portion 34 having a large area cannot be formed on the sliding contact surface 32. Thus a decrease in the sliding contact area is limited.

The present invention has been made to deal with the above-described problems. Therefore it is an object of the present invention to provide a seal ring which has small oil leak and low torque generation performance for improving fuel consumption in a favorable balance as originally intended by the present invention.

Means for Solving the Problem

The seal ring of the present invention is mounted on an annular groove formed on one member consisting of either a housing having a shaft hole or a rotary shaft inserted into the shaft hole, contacts a surface of other member consisting of either the housing or the rotary shaft, and slidably contacts a side wall surface of the annular groove at a non-sealed fluid side thereof, thereby sealing an annular gap between the one member and the other member. V-shaped concave portions along a circumferential direction of the seal ring are formed on at least one portion of an end of an inner diameter side of a side surface of the seal ring serving as a sliding contact surface which contacts the side wall surface of the annular groove. The concave portions do not contact the side wall surface of the annular groove. An opening dimension of an outer diameter side of the concave portion is set larger than that of an inner diameter side thereof.

A deepest portion of the concave portion from the sliding contact surface thereof is disposed at a position other than ends thereof in the circumferential direction of the seal ring; and a depth of the concave portion becomes shallower from the deepest portion toward ends thereof in the circumferential direction of the seal ring and is constant in a radial direction of the seal ring.

A boundary portion disposed between both ends of the concave portion in the circumferential direction of the seal ring and the sliding contact surface forms a steep gradient with the sliding contact surface. The boundary portion disposed between the both ends of the concave portion in the circumferential direction of the seal ring and the sliding contact surface is rounded. A plurality of the concave portions is formed by spacing the concave portions at certain intervals in the circumferential direction of the seal ring; and a portion of the side surface of the seal ring disposed between the concave portions adjacent to each other constitutes a part of the sliding contact surface.

The seal ring is made of synthetic resin consisting of polyphenylene sulfide (hereinafter referred to as PPS) resin or polyether ether ketone resin (hereinafter referred to as PEEK).

Effect of the Invention

The seal ring of the present invention is mounted on the annular groove formed on one member consisting of either the housing having the shaft hole or the rotary shaft inserted into the shaft hole, contacts the surface of other member consisting of either the housing or the rotary shaft, and slidably contacts the side wall surface of the annular groove at a non-sealed fluid side thereof, thereby sealing the annular gap between the one member and the other member. V-shaped concave portions along a circumferential direction of the seal ring are formed on at least one portion of an end of an inner diameter side of a side surface of the seal ring serving as a sliding contact surface which contacts the side wall surface of the annular groove. The concave portions do not contact the side wall surface of the annular groove. This construction allows hydraulic oil or the like which is the sealed fluid to easily and moderately flow to the sliding contact surface through the concave portions. Thereby the seal ring has small oil leak and low torque generation performance in a favorable balance.

The hydraulic oil or the like which has flowed into the concave portion flows out to the sliding contact surface owing to rotation of the seal ring relative to the rotary shaft. By setting the opening dimension of the outer diameter side of the V-shaped concave portion larger than that of the inner diameter side thereof, the hydraulic oil or the like is allowed to flow to the sliding contact surface in a large amount. Thereby the seal ring displays sufficient low torque generation performance.

The deepest portion of the concave portion from the sliding contact surface thereof is disposed at the position other than ends thereof in the circumferential direction of the seal ring; and the depth of the concave portion becomes shallower from the deepest portion toward ends thereof in the circumferential direction of the seal ring and is constant in the radial direction of the seal ring. This construction of the concave portion allows the hydraulic oil or the like which is the sealed fluid to easily flow to a portion of the sliding contact surface (the side surface of the seal ring) disposed between adjacent concave portions. Thus the seal ring has sufficient low torque generation performance. On the other hand, the construction makes it difficult for the hydraulic oil or the like to flow to the outer diameter side sliding contact surface of the concave portion.

The boundary portion disposed between the ends of the concave portion in the circumferential direction of the seal ring and the sliding contact surface forms the steep gradient with the sliding contact surface. This construction allows the opening space of the concave portion to decrease to a lower extent, when the sliding contact surface wears. Thereby there is no change in the extent of the torque. The boundary portion disposed between the ends of the concave portion in the circumferential direction of the seal ring and the sliding contact surface is rounded. The hydraulic oil or the like which is the sealed fluid is allowed to easily flow to the portion of the sliding contact surface (the side surface of the seal ring) disposed between adjacent concave portions. Thereby the seal ring is allowed to have low torque generation performance to a higher extent.

The seal ring is made of synthetic resin consisting of PPS resin or PEEK resin. These resins are excellent in their bending elastic modulus, heat resistance, and the like. Thereby the seal ring is not broken when the diameter of the seal ring increases in mounting the seal ring on the groove and can be used even when the temperature of the sealed hydraulic oil becomes high.

MODE FOR CARRYING OUT THE INVENTION

Figure 1:
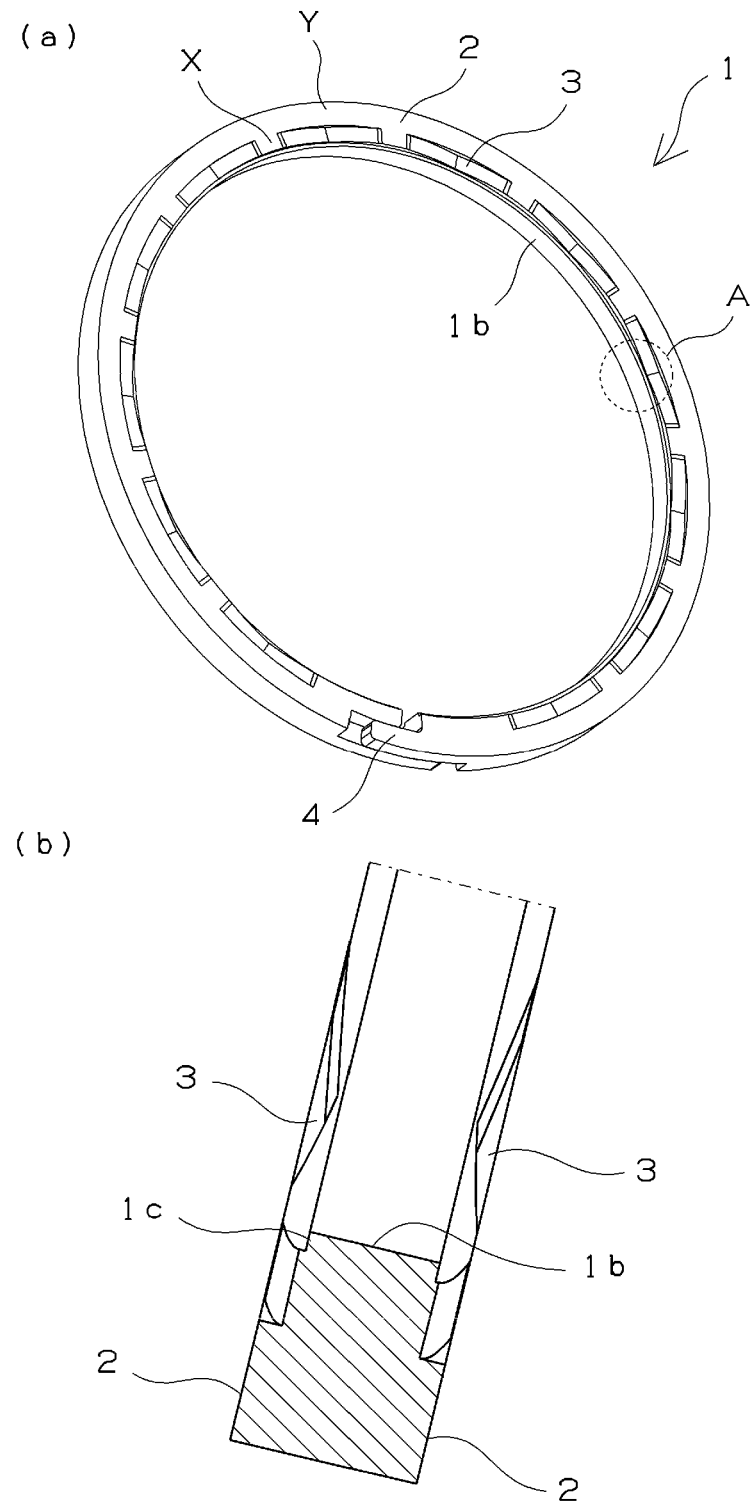
FIG. 1 is perspective and sectional views showing one example of a seal ring of the present invention.
Figure 2:
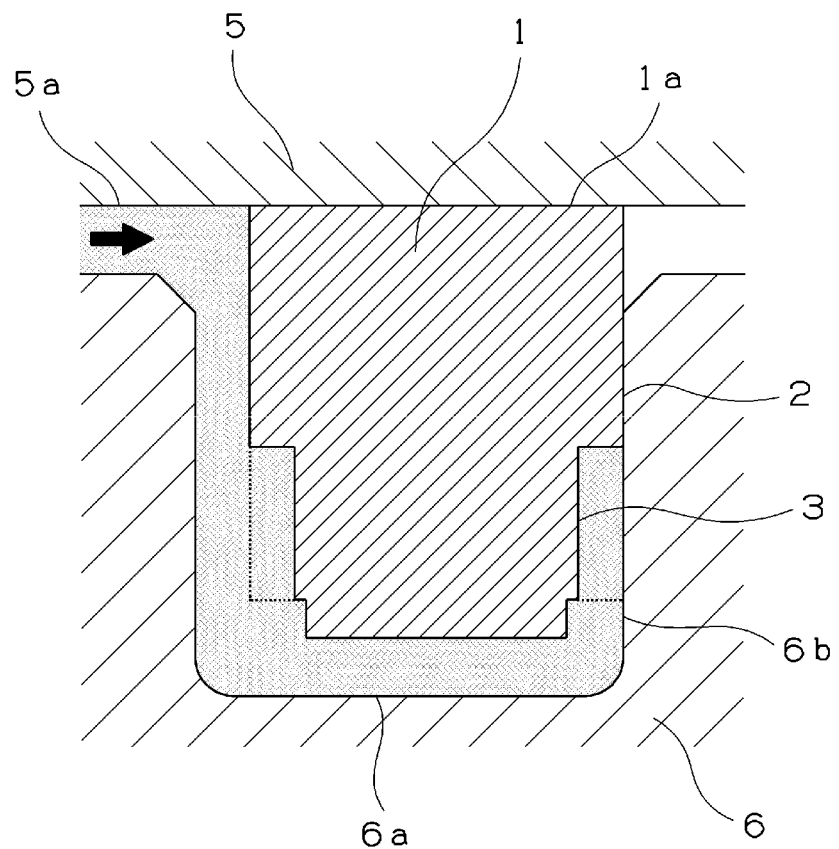
FIG. 2 is a sectional view showing a state in which the seal ring shown in FIG. 1 is mounted on an annular groove.

One example of a seal ring of the present invention is described below based on FIGS. 1 and 2. FIG. 1(*a*) is a perspective view showing the seal ring. FIG. 1(*b*) is a partly enlarged sectional view showing the seal ring shown in FIG. 1(*a*). FIG. 2 is a sectional view showing a state in which the seal ring is mounted on an annular groove of a hydraulic apparatus. As shown in FIGS. 1(*a*) and 1(*b*), the seal ring 1 is an annular body approximately rectangular in a sectional view and has one abutment 4. A plurality of V-shaped concave portions 3 are formed at an end of an inner diameter side of each of both side surfaces 2 of the seal ring along a circumferential direction of the seal ring. A corner formed between an inner circumferential surface 1*b* of the seal ring and both side surfaces 2 (including the concave portions 3) may be chamfered linearly or curvingly. In producing the seal ring by injection molding, a stepped portion 1*c* which is a portion projected from a die may be formed at the above-described corners.

As shown in FIG. 2, the seal ring 1 is mounted on an annular groove 6*a* formed on a rotary shaft 6 inserted into a shaft hole 5*a* of a housing 5. The arrow shown in FIG. 2 indicates a direction in which the pressure of hydraulic oil is applied to the seal ring. An unsealed fluid side is disposed at a right-hand side in FIG. 2. The side surface 2 of the seal ring 1 slidably contacts a side wall surface 6*b* of the annular groove 6*a* disposed at the unsealed fluid side thereof. An outer circumferential surface 1*a* of the seal ring contacts an inner circumferential surface of the shaft hole 5*a*. This sealing construction seals an annular gap disposed between the rotary shaft 6 and the shaft hole 5*a*. The sealing construction is also applicable to a construction in which the annular groove is formed not at a rotary shaft side but at a housing side. In dependence on use, a suitable kind of the hydraulic oil is used. In the present invention, conditions in which oil temperature is 30 to 150 degrees C., oil pressure is 0.5 to 3.0 MPa, and the number of rotations of the rotary shaft is 1000 to 7000 rpm are assumed.

A cut type seal ring having one abutment 4 (see FIG. 1) is used as the seal ring 1. The seal ring is mounted on the annular groove 6a owing to an increase in its diameter caused by elastic deformation. Because the seal ring 1 has the abutment 4, the diameter of the seal ring is increased by the hydraulic pressure of the hydraulic oil during the use of the seal ring. Thereby the outer circumferential surface 1a of the seal ring closely contacts the inner circumferential surface of the shaft hole 5a. Regarding the configuration of the abutment 4, it is possible to adopt a straight-cut type or an angle-cut type. But it is preferable to adopt a complex cut type shown in FIG. 1(a) because the complex cut type is excellent in its sealing performance.

As shown in FIGS. 1 and 2, one side surface of the seal ring 1 serves as a sliding contact surface which slidably contacts the side wall surface of the annular groove. The V-shaped concave portions 3 which do not contact the side wall surface of the annular groove are formed on the above-described one side surface (sliding contact surface) of the seal ring. The concave portions allow the hydraulic oil or the like which is a sealed fluid to easily and moderately flow to the sliding contact surface therethrough. In more detail, a boundary portion disposed between a sliding contact surface X disposed between adjacent concave portions and the adjacent concave portions has a continuous configuration, whereas a boundary portion between a sliding contact surface Y disposed outward from the concave portions and the concave portions has an uncontinuous configuration (different in level). Thus the former boundary allows the hydraulic oil or the like to easily flow to the sliding contact surface X, whereas the latter boundary does not allow the hydraulic oil or the like to flow to the sliding contact surface Y as easily as the configuration of the former boundary. Owing to the flow of the hydraulic oil which is the sealed fluid to the sliding contact surfaces X and Y, it is possible to form the oil film on the sliding contact surfaces X and Y and thus generate torque and wear to a low extent. In addition, the restraining of a large amount of the hydraulic oil from flowing to the sliding contact surface Y leads to small oil leak.

The concave portions should be formed on at least one side surface serving of the seal ring as the sliding contact surface. But it is preferable to form the concave portions on both side surfaces of the seal ring symmetrically, as shown in FIG. 1, considering that to form the concave portions on both side surfaces of the seal ring is not dependent on a direction in which the seal ring is mounted on the annular groove and is excellent in the weight balance of the seal ring.

As shown in FIG. 1, it is preferable to form a plurality of the concave portions 3 by spacing them at certain intervals in the circumferential direction of the seal ring. A portion of the side surface 2 of the seal ring disposed between adjacent concave portions constitutes a part (sliding contact surface X) of the sliding contact surface. As described above, it is possible to form an oil film on the portion of the sliding contact surface between the adjacent concave portions during the use of the seal ring and thereby generate the torque and the wear to a low extent. It is preferable to set the length of each concave portion in the circumferential direction of the seal ring to 3 to 20% of the entire circumference of the seal ring in dependence on the number of the concave portions to be formed. It is preferable to set the length of each concave portion in the radial direction of the seal ring to 10 to 60% of the total thickness of the seal ring. It is also preferable to form a plurality of the concave portions having an equal size by spacing them at approximately regular intervals (12 concave portions are formed on one side surface of the seal ring shown in FIG. 1) because this construction of the concave portions allows the sliding contact property of the seal ring to be stable.

Figure 3:
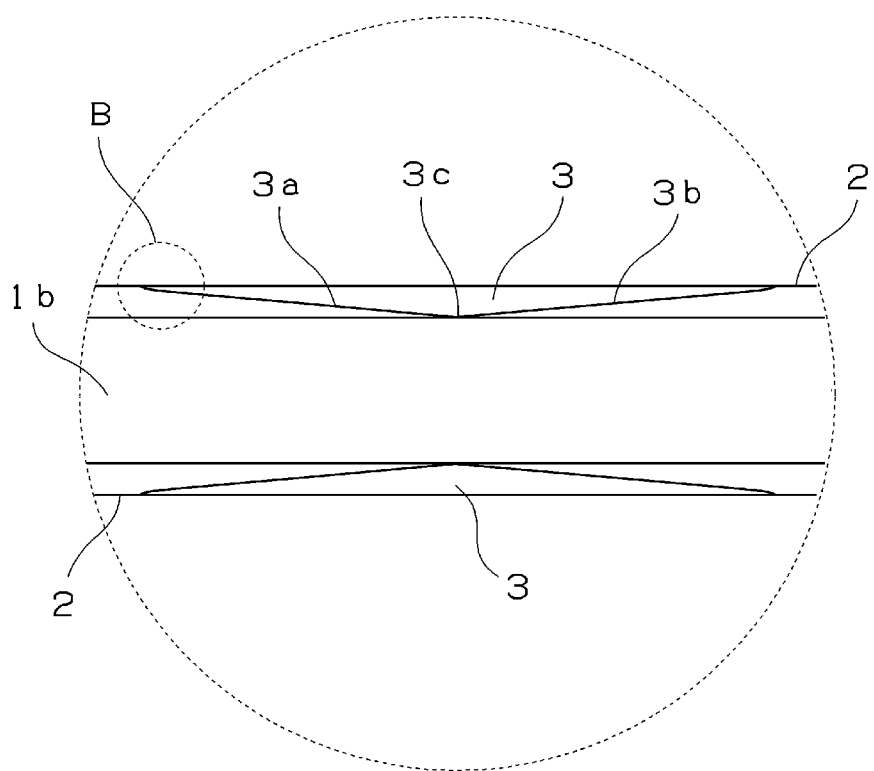
FIG. 3 shows a portion of the seal ring as viewed from an inner diameter side of the seal ring.

The V-shaped concave portion is described in detail below with reference to FIG. 3. FIG. 3 shows a portion (portion A in FIG. 1) of the seal ring of the present invention, as viewed from an inner diameter side of the seal ring. As shown in FIG. 3, the concave portion 3 is V-shaped in the circumferential direction of the seal ring. One of the side surfaces 2 of the seal ring serves as the sliding contact surface which slidingly contacts the annular groove. A deepest portion 3c of each concave portion from the sliding contact surface thereof is disposed at a position other than both ends thereof in the circumferential direction of the seal ring. The concave portion becomes shallower from its deepest portion 3c to its both ends in the circumferential direction of the seal ring. That is, the depth of the concave portion becomes gradually shallower as a bottom surface thereof approaches the sliding contact surface in the circumferential direction of the seal ring. The depth of the concave portion 3 from the sliding contact surface is constant in the radial direction of the seal ring. In the example shown in FIGS. 1 and 3, a bottom surface of the concave portion 3 is constructed of flat surfaces 3a and 3b tilting from the sliding contact surface (the side surface 2 of the seal ring) toward the center of the concave portion in a width direction thereof along the circumferential direction of the seal ring.

Figure 11:
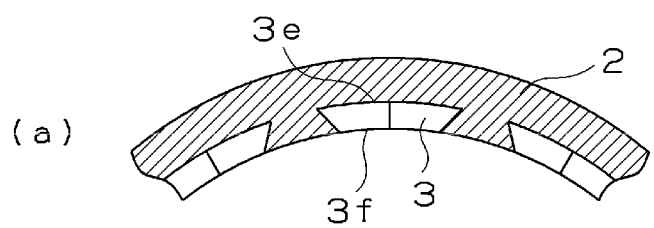
FIG. 11 shows other embodiments of a V-shaped concave portion.
Figure 11:
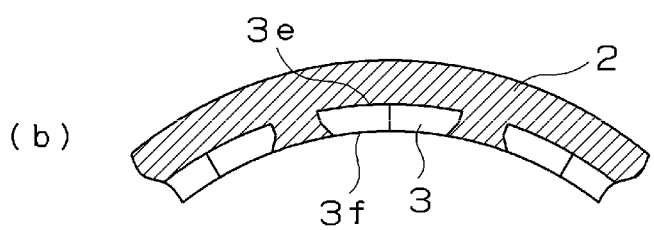
Figure 11:
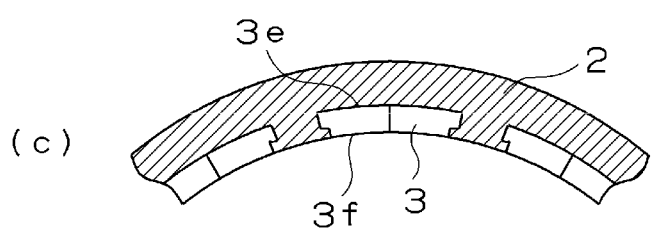

The V-shaped concave portions of other modes are described below with reference to FIG. 11. FIGS. 11(a) through 11(c) show the V-shaped concave portions of the seal ring, as viewed from the front direction thereof. As shown in FIGS. 11(a) through 11(c), in these modes, each of the V-shaped concave portions is so designed that the opening dimension of an outer diameter side 3e of the V-shaped concave portion 3 of each mode is set larger than that of an inner diameter side 3f thereof. That is, on the side surface 2 of the seal ring, the front configuration of the V-shaped concave portion 3 which is the surface (blank portion) not contacting the side wall surface of the annular groove is so formed that the non-contact area of the outer diameter side 3e of the V-shaped concave portion is larger than that of the inner diameter side 3f thereof. By so designing the V-shaped concave portion that the opening dimension of the inner diameter side thereof is set smaller than that of the outer diameter side thereof, when the hydraulic oil or the like which has flowed into the V-shaped concave portion flows out therefrom owing to a rotation of the seal ring relative to the rotary shaft, the hydraulic oil or the like is allowed to flow to the sliding contact surface in a larger amount than the V-shaped concave portion having a construction in which the opening dimension of the inner diameter side of the V-shaped concave portion is equal to that of the outer diameter side thereof. This is because when the hydraulic oil or the like which has flowed out of the V-shaped concave portion collides with the ends thereof in the circumferential direction thereof, it is possible to reduce the amount of the hydraulic oil or the like which flows to the inner diameter side of the seal ring.

In the example shown in FIGS. 1 and 3, the deepest portion 3c is disposed at the central position of the concave portion 3 in the circumferential direction of the seal ring. But the position of the deepest portion is not limited thereto. In this example, the bottom surface of the concave portion 3 is constructed of the flat surfaces 3a and 3b tilting along the circumferential direction of the seal ring, but may be constructed not of the flat surface but of a curved surface. In addition to the V-shaped configuration formed by only connecting the flat surfaces 3a and 3b to each other, the deepest portion 3c may have a curved configuration or a horizontal configuration. The deepest portion 3c having the curved configuration or the horizontal configuration does not adversely affect the effect in decreasing the torque.

It is favorable to set the depth of the deepest portion 3c of the concave portion 3 from the sliding contact surface to not more than 45% of the total width of the seal ring and more favorable to set the depth thereof from the sliding contact surface to not more than 30% of the total width of the seal ring. In the case where the concave portion is formed on both side surfaces of the seal ring, the "depth" means the total of the depth of the concave portion formed on one side surface of the seal ring and that of the concave portion formed on the other side surface thereof. In the case where the depth of the concave portion exceeds 45% of the total width of the seal ring, there is a fear that the seal ring may be deformed to a high extent during the use thereof.

Figure 4:
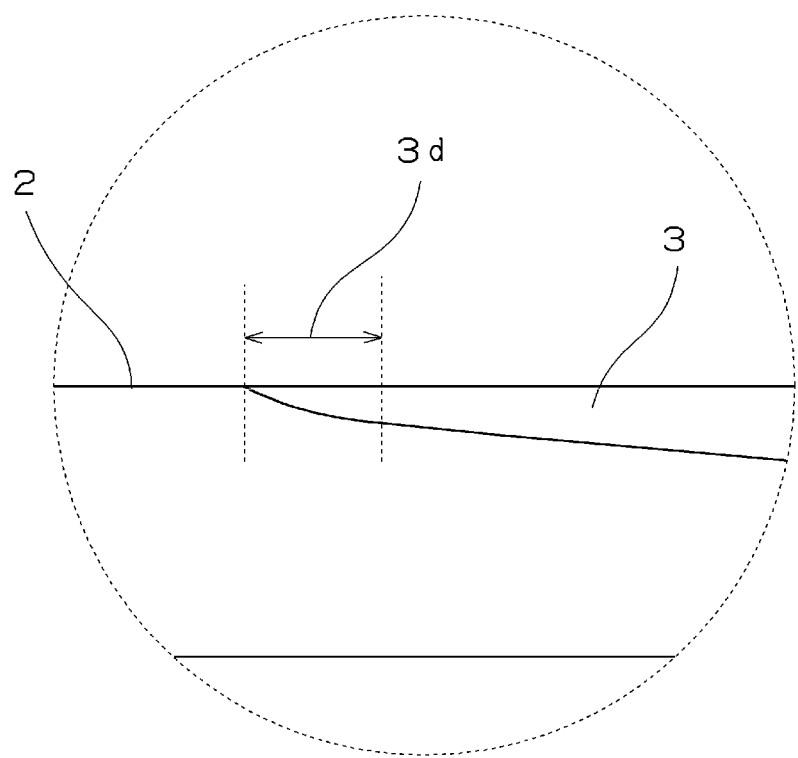
FIG. 4 is an enlarged view of a portion B shown in FIG. 3.
Figure 5:
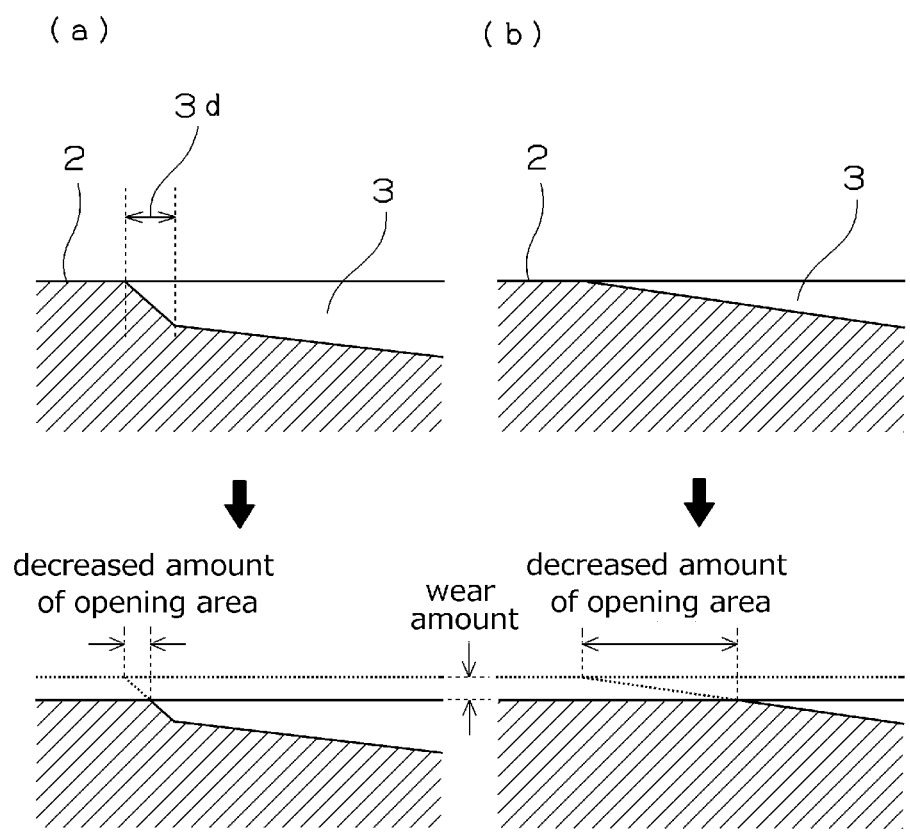
FIG. 5 is a sectional view showing one example of a boundary portion.

A boundary portion between both ends of the concave portion in the circumferential direction of the seal ring and the sliding contact surface is described below with reference to FIGS. 4 and 5. FIG. 4 is an enlarged view of a portion B shown in FIG. 3. FIG. 5 is an enlarged sectional view showing one example of the boundary portion. As shown in FIG. 5(a), it is preferable that a boundary portion 3d between both ends of the concave portion 3 in the circumferential direction of the seal ring and the sliding contact surface (side surface 2 of the seal ring) forms a steep gradient with the sliding contact surface. That is, it is preferable to set the gradient of the boundary portion with respect to the sliding contact surface larger than the gradients of portions other than the boundary portion 3d with respect to the sliding contact surface. This construction allows the opening space of the concave portion to decrease to a lower extent than a case in which the steep gradient is not formed (FIG. 5(b)), when the sliding contact surface wears to the same extent in the construction where the steep gradient is formed and the construction where the steep gradient is not formed. Thereby there is no change in the extent of the torque. The steep gradient can be formed by convexly rounding the concave portion at a central side thereof in the width direction of the seal ring. By rounding the boundary portion 3d having a steep gradient, the hydraulic oil or the like which is the sealed fluid is allowed to easily flow to the sliding contact surface. Thereby the seal ring is allowed to have low torque generation performance to a higher extent.

The material for the seal ring of the present invention is not specifically limited. But considering that the concave portion is formed on the side surface of the seal ring and that the seal ring is mounted on the groove owing to an increase in the diameter thereof caused by the elastic deformation thereof, it is preferable to form the seal ring as a molded body consisting of synthetic resin. Examples of synthetic resin which can be used in the present invention include thermosetting polyimide resin, thermoplastic polyimide resin, polyether ketone ether ketone ketone resin, polyether ketone resin, PEEK resin, wholly aromatic polyester resin, fluororesin such as polytetrafluoroethylene (hereinafter referred to as PTFE), PPS resin, polyamideimide resin, and polyamide resin. It is possible to use these resins singly or as polymer alloys obtained by mixing not less than two kinds thereof with each other.

It is preferable to produce the seal ring as an injection molded body obtained by injection molding the synthetic resin because the injection molded body allows the seal ring which has the above-described concave portion and the abutment of the composite step cut type to be produced easily at a low cost, generates a lower torque than the seal ring produced by machining work, and operates stably. Therefore it is preferable to use injection-moldable thermoplastic resins as the synthetic resin. Especially among the thermoplastic resins, it is preferable to use the PEEK resin or the PPS resin because these resins are excellent in the friction and wear property, bending elastic modulus, heat resistance, and sliding contact property thereof. These resins have a high modulus of elasticity and thus are not broken when the diameter of the seal ring consisting of these resins increases in mounting the seal ring on the groove. Further the seal ring can be used even when the temperature of the sealed hydraulic oil becomes high. In addition, there is no fear of the occurrence of solvent crack.

It is possible to add a fibrous reinforcing material such as carbon fiber, glass fiber, and aramid fiber; spherical filler such as spherical silica and spherical carbon; a scaly reinforcing material such as mica and talc; and a microfiber reinforcing material such as potassium titanate whisker to the above-described synthetic resins as necessary. In addition, it is also possible to add a solid lubricant such as PTFE resin, graphite, and molybdenum disulfide; and a sliding reinforcing material such calcium phosphate, and calcium sulfate; and carbon black to the synthetic resins. These substances can be added to the synthetic resins singly or in combination. A material containing the PEEK resin or the PPS resin to which the carbon fiber which is the fibrous reinforcing material and the PTFE resin which is the solid lubricant are added is preferable because the material is capable of easily obtaining the property demanded for the seal ring of the present invention. The addition of the carbon fiber to the PEEK resin or the PPS resin allows the material for the seal ring to have improved mechanical strength such as bending elastic modulus. The addition of the PTFE resin to the PEEK resin or the PPS resin allows the material to have improved sliding contact property.

In producing the seal ring consisting of the synthetic resin, the above-described materials are fused and kneaded to form a molding pellet. Thereafter the pellet is molded into a predetermined configuration by using a known injection molding method. In the case where the seal ring is produced by the injection molding, a gate position is not specifically limited. But it is preferable to form the gate position on the inner circumferential surface of the seal ring from the standpoint of securing the sealing performance of the seal ring and non-requirement of post processing. In addition, it is preferable to form the gate position at a portion of the inner circumferential surface of the seal ring opposed to the abutment from the viewpoint of a flow balance in the injection molding.

EXAMPLES

Example 1 and Comparative Examples 1 Through 3

Figure 12:
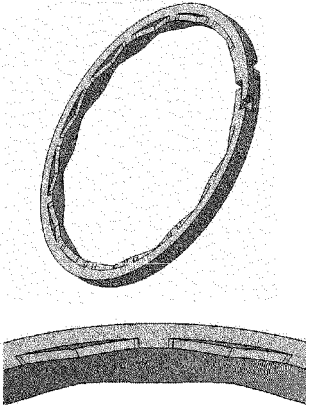
FIG. 12 is a table of data that compares Example 1 with three comparative Examples.
Figure 12:
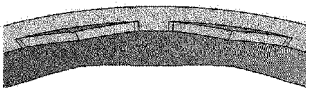
Figure 12:
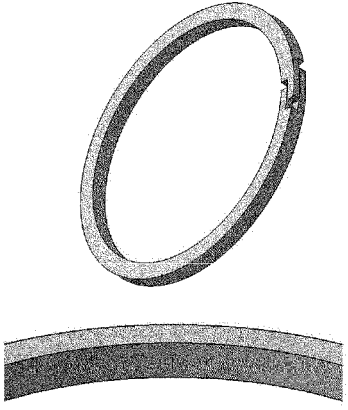
Figure 12:
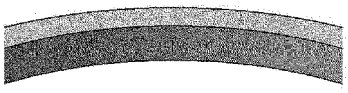

By using a resin composition (BarryPK5301 produced by NTN ENGINEERING PLASTICS CORPORATION) containing the PEEK resin as its main component and the carbon fiber and the PTFE resin both added to the main component, seal bearings (outer diameter: φ50 mm, inner diameter: φ47 mm, width of seal ring: 1.5 mm, and thickness of seal ring: 1.5 mm) having configurations shown in table 1 were produced by using injection molding. The sliding contact area shown in FIG. 12 is the area of the side surface of each seal ring except the concave portion which is a non-contact portion.

Reference Example 1

Figure 9:
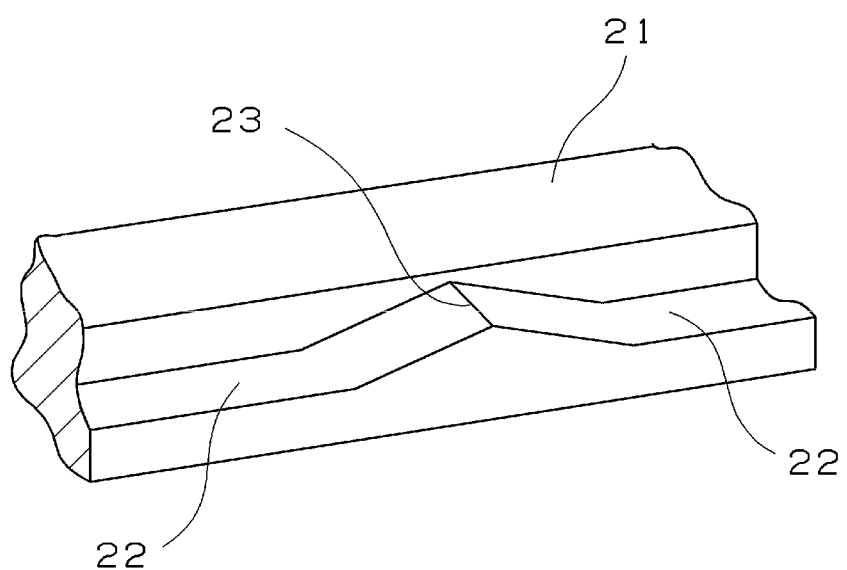
FIG. 9 shows one example of conventional seal rings.
Figure 10:
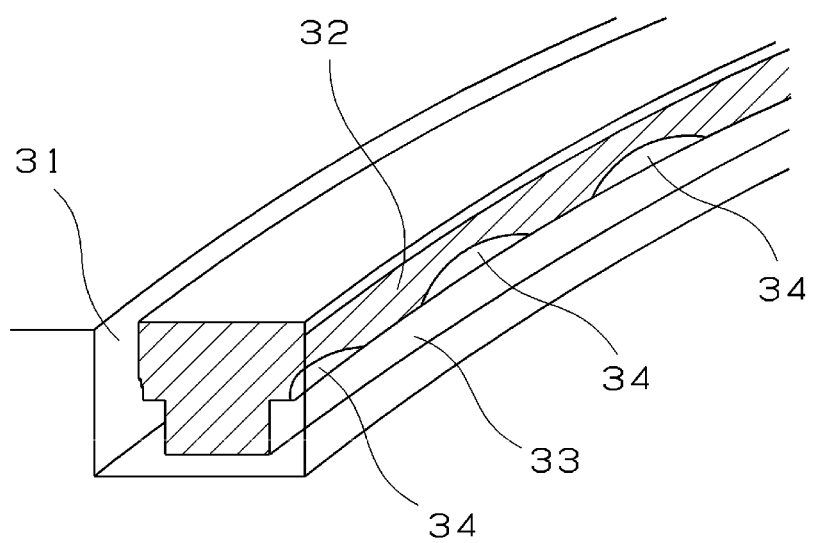
FIG. 10 shows another example of the conventional seal rings.

By using the same material as that of the example 1, seal bearings (outer diameter: φ50 mm, inner diameter: φ47 mm, width of seal ring: 1.5 mm, and thickness of seal ring: 1.5 mm) having configurations shown in FIG. 9 were produced by using the injection molding.

Figure 6:
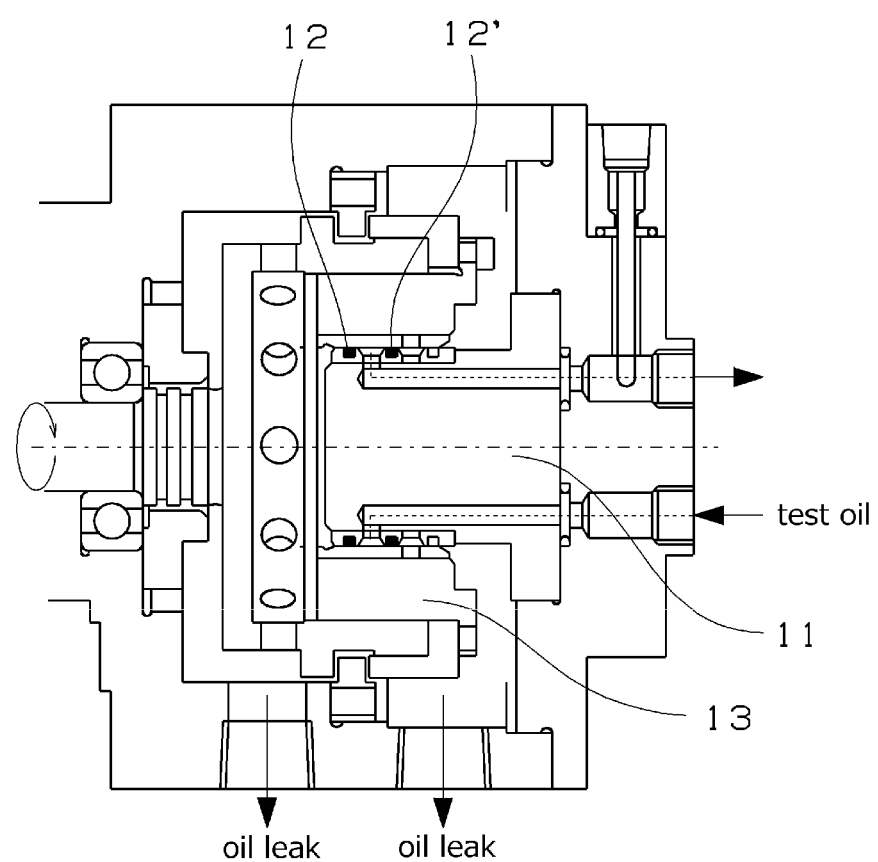
FIG. 6 is a schematic view of a testing machine for testing the properties of seal rings.

The properties of the obtained seal rings such as the rotation torque, oil leak amount, and wear amount thereof were evaluated by using a testing machine shown in FIG. 6. FIG. 6 is a schematic view of the testing machine. Seal rings 12, 12' were mounted on an annular groove of a mating shaft 11. The seal rings 12, 12' make sliding contact with a side wall of the annular groove of the mating shaft 11 and an inner circumferential surface of a shaft hole of a housing 13. Oil was fed under pressure from the right-hand side of the testing machine to supply the oil to an annular gap disposed between the seal rings 12, 12'. As conditions set in a rotation torque test, hydraulic pressure: 0.5 to 3.0 MPa, oil temperature: 30 to 150 degrees C., and number of rotations: 1000 to 7000 rpm. As the conditions set in an oil leak test, hydraulic pressure: 0.5 to 3.0 MPa, number of rotations: 1000 to 7000 rpm; and oil temperature: 30 to 150 degrees C. (four conditions of 30 degrees C., 70 degrees C., 110 degrees C., and 150 degrees C.). As the conditions set in a wear test, hydraulic pressure: 3.0 MPa, oil temperature: 150 degrees C., and number of rotations: 7000 rpm.

Figure 7:
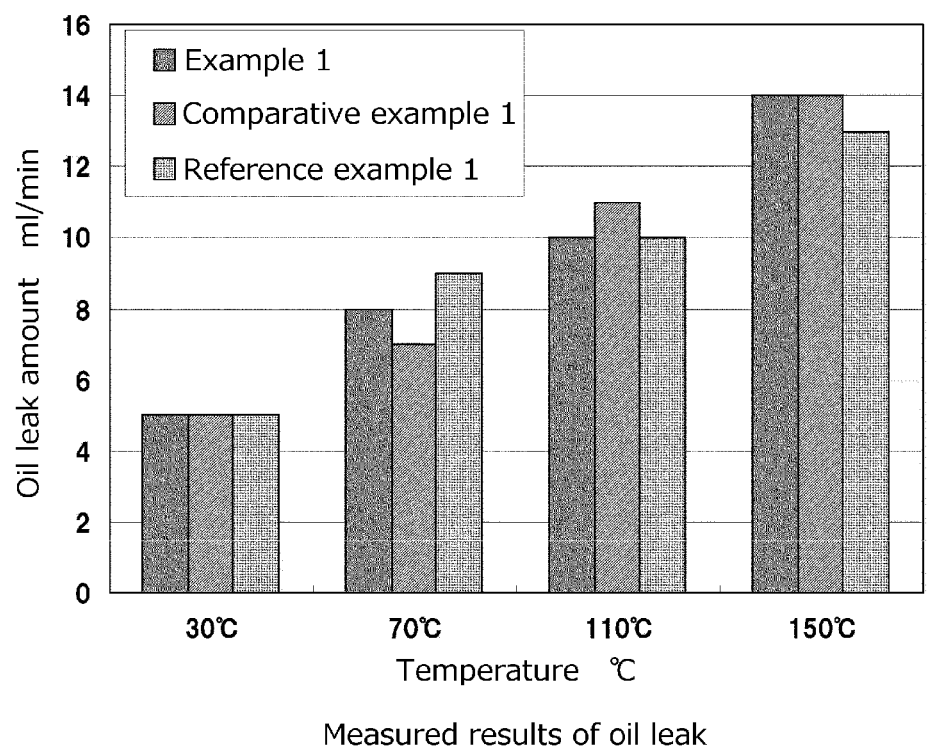
FIG. 7 shows showing test results of oil leak.
Figure 8:
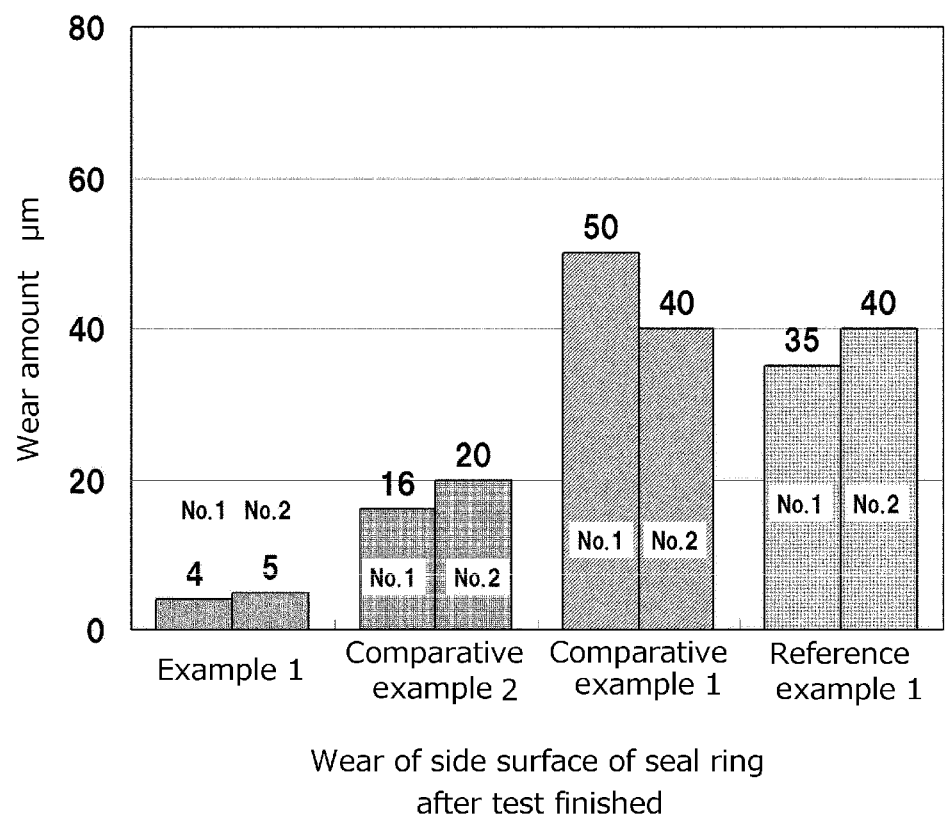
FIG. 8 shows the results of a wear amount.

By using the testing machine, the rotation torque of the mating shaft, the oil leak amount (ml/minute), and the wear amount (wear depth, μm) of the side surface of each seal ring were measured. The rotation torque and the oil leak amount are based on values measured immediately after the test started. The wear amount was measured in the lapse of one hour after the test started. Table 1 shows the results. Regarding the rotation torque, the rotation torque in the comparative example 1 measured in the same condition was set to 100% and those in the example 1 and other comparative examples are shown by comparison with that of the comparative example 1. FIG. 7 shows the oil leak amount. FIG. 8 shows the wear amount.

TABLE 1

|  | Example 1 | Comparative example 1 | Comparative example 2 | Comparative example 3 | Reference example 1 |
|---|---|---|---|---|---|
| Rotation torque, % | 27 to 46 | 100 | 39 to 59 | 35 to 55 | 64 to 78 |
| Oil leak, ml/min | 5 to 14 | 5 to 14 | — | 8 to 16 | 5 to 13 |
| Wear amount (side surface), μm | 5 | 50 | 20 | — | 40 |

As shown in table 1, the rotation torque of the example 1 was lowest at the time of a low speed rotation and a high speed rotation. The rotation torque of the example 1 was lower than that of the comparative example 1 by not less than 50%. The sealing property of the example 1 was equivalent to that of the comparative example 1 (seal ring not having a groove). The wear amount of the example 1 was smallest and about 10% of that of the comparative example 1 (seal ring not having a groove). The results indicate that the seal ring of the example 1 has the small oil leak and the low torque generation performance in a favorable balance.

INDUSTRIAL APPLICABILITY

The seal ring of the present invention has the small oil leak and the low torque generation performance in a favorable balance as originally intended by the present invention. Therefore the seal ring can be used between the rotary shaft and the housing as the seal ring which meets the requirement for these performances. The seal ring can be preferably used to improve fuel consumption of hydraulic equipment such as an AT and a CVT of a car and the like.

EXPLANATION OF REFERENCE NUMERALS AND SYMBOLS

1: seal ring
2: side surface of seal ring
3: V-shaped concave portion
4: abutment
5: housing
6: rotary shaft
11: mating shaft
12, 12': seal ring
13: housing

The invention claimed is:

1. A seal ring which is mounted on an annular groove formed on one member consisting of either a housing having a shaft hole or a rotary shaft inserted into said shaft hole, contacts a surface of other member consisting of either said housing or said rotary shaft, and slidably contacts a side wall surface of said annular groove at a non-sealed fluid side thereof, thereby sealing an annular gap between said one member and said other member, wherein V-shaped concave portions along a circumferential direction of said seal ring are formed on at least one portion of an end of an inner diameter side of a side surface of said seal ring serving as a sliding contact surface which contacts said side wall surface of said annular groove, wherein said concave portions do not contact said side wall surface of said annular groove, wherein a plurality of said concave portions are formed by spacing said concave portions at certain intervals in said circumferential direction of said seal ring; and a portion of said side surface of said seal ring disposed between said concave portions adjacent to each other constitutes a part of said sliding contact surface, wherein a bottom surface of said concave portion comprises two flat surfaces tilting along said circumferential direction of said seal ring, wherein a deepest portion of said concave portion from said sliding contact surface thereof is disposed at a position other than both ends thereof in said circumferential direction of said seal ring; and in said tilting flat surfaces, a depth of said concave portion becomes shallower from said deepest portion toward said both ends thereof in said circumferential direction of said seal ring, wherein two boundary portions disposed between said both ends of said concave portion in said circumferential direction of said seal ring and said sliding contact surface form steep gradients with respect to said sliding contact surface, wherein in said concave portion, said gradients of said two boundary portions with respect to said sliding contact surface are larger than gradients of said tilting flat surfaces with respect to said sliding contact surface.

2. The seal ring according to claim 1, wherein an opening dimension of an outer diameter side of said concave portion is set larger than that of an inner diameter side thereof.

3. The seal ring according to claim 1, wherein said two boundary portions disposed between said both ends of said concave portion in said circumferential direction of said seal ring and said sliding contact surface are rounded.

4. The seal ring according to claim 1, which is made of synthetic resin consisting of polyphenylene sulfide resin or polyether ether ketone resin.

* * * * *